United States Patent [19]

Wolf

[11] 4,325,228

[45] Apr. 20, 1982

[54] GEOTHERMAL HEATING AND COOLING SYSTEM

[76] Inventor: Herman B. Wolf, Rte. 1, Box 99-P, Pineville, N.C. 28134

[21] Appl. No.: 151,583

[22] Filed: May 20, 1980

[51] Int. Cl.$^3$ .................... F28D 7/12; F25D 23/12
[52] U.S. Cl. ....................... 62/260; 165/45; 165/142
[58] Field of Search ............ 62/260; 237/2 B; 165/45, 142

[56] References Cited

U.S. PATENT DOCUMENTS

| | | | |
|---|---|---|---|
| 1,981,730 | 11/1934 | Hawkins | 165/45 |
| 2,167,878 | 8/1939 | Crawford | 62/260 X |
| 2,438,720 | 3/1948 | Smith | 165/45 |
| 2,461,449 | 2/1949 | Smith et al. | 62/325 X |
| 2,513,373 | 7/1950 | Sporn et al. | 62/260 X |
| 3,563,304 | 2/1971 | McGrath | 165/2 |
| 4,008,709 | 2/1977 | Jardine | 165/45 X |
| 4,171,721 | 10/1979 | Movick | 165/45 |
| 4,257,239 | 3/1981 | Partin et al. | 62/324.6 |

OTHER PUBLICATIONS

Water Well Journal 12/1979 pp. 26 and 27.
EPRI Journal 3/1980.

*Primary Examiner*—William E. Wayner
*Attorney, Agent, or Firm*—Bell, Seltzer, Park & Gibson

[57] ABSTRACT

The geothermal system for conditioning air includes a heat pump (10) of the liquid-to-air type and an improved heat sink (40) in heat exchange relationship with the subterranean water system of the earth and connected to the heat pump through a liquid circulating system. The heat sink includes an elongate metallic liquid container (41) providing a large amount of surface contact with the earth and of a sufficient length and buried at a sufficient depth to provide a good heat transfer relationship with the subterranean water system of the earth. A liquid inlet conduit (44) communicates with the interior of the upper end of the liquid container (41) and an outlet conduit (insulator tube 45 and return pipe 54) extends longitudinally within the container and thermally insulates the outlet liquid from the liquid in the container. A liquid dispensing tube (75) is provided to periodically dispense liquid into the soil surrounding the container (41) to maintain the soil in a moist state and to thereby increase the thermal conductivity between the container (41) and the surrounding earth and subterranean water system.

11 Claims, 6 Drawing Figures

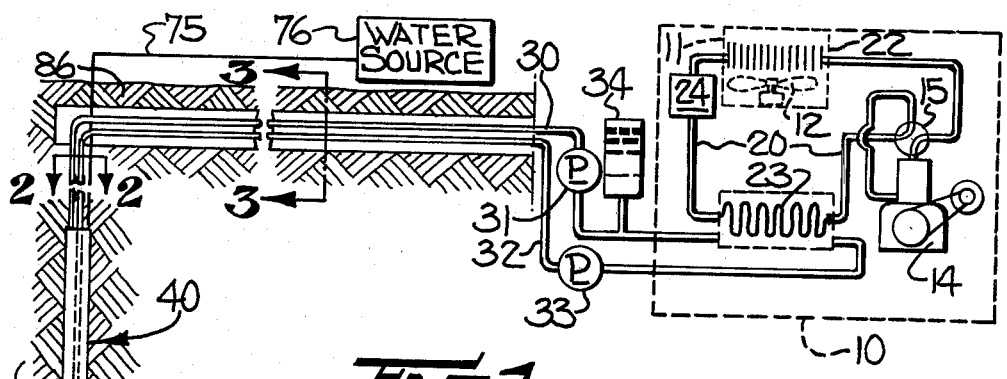
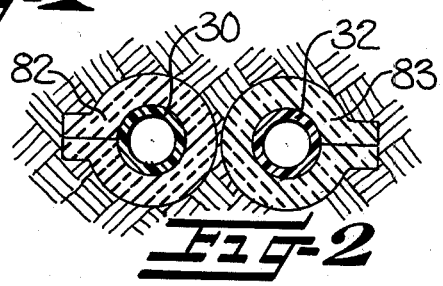
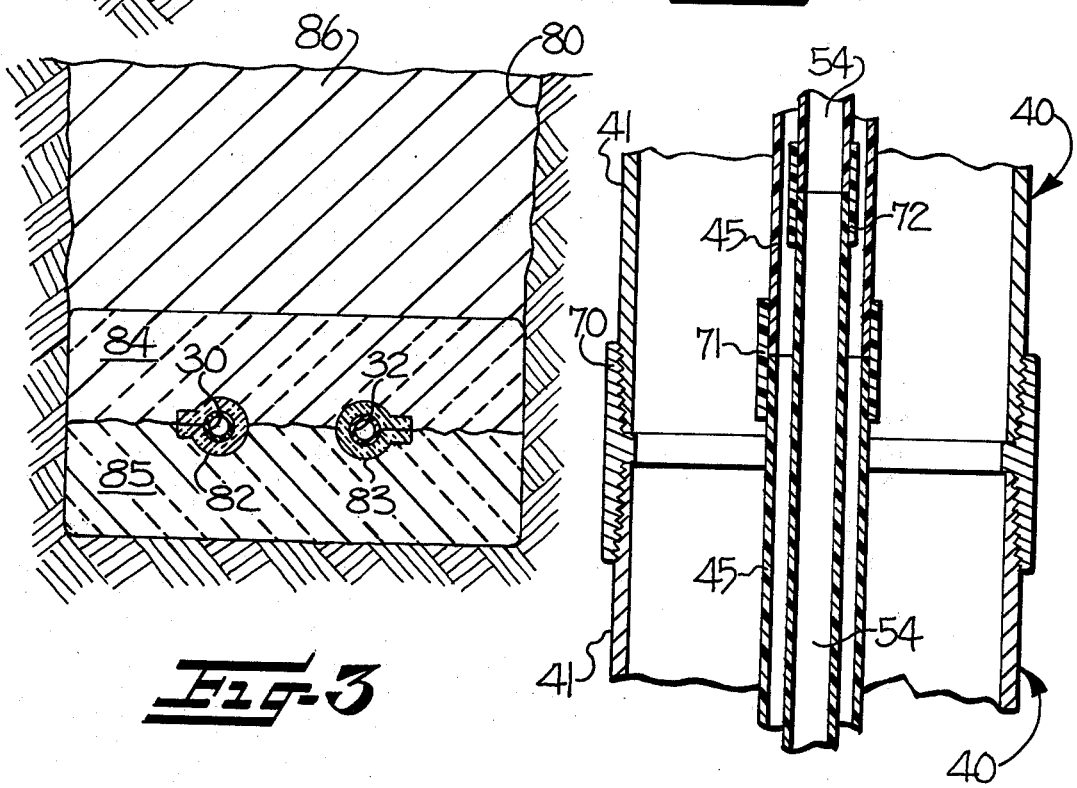

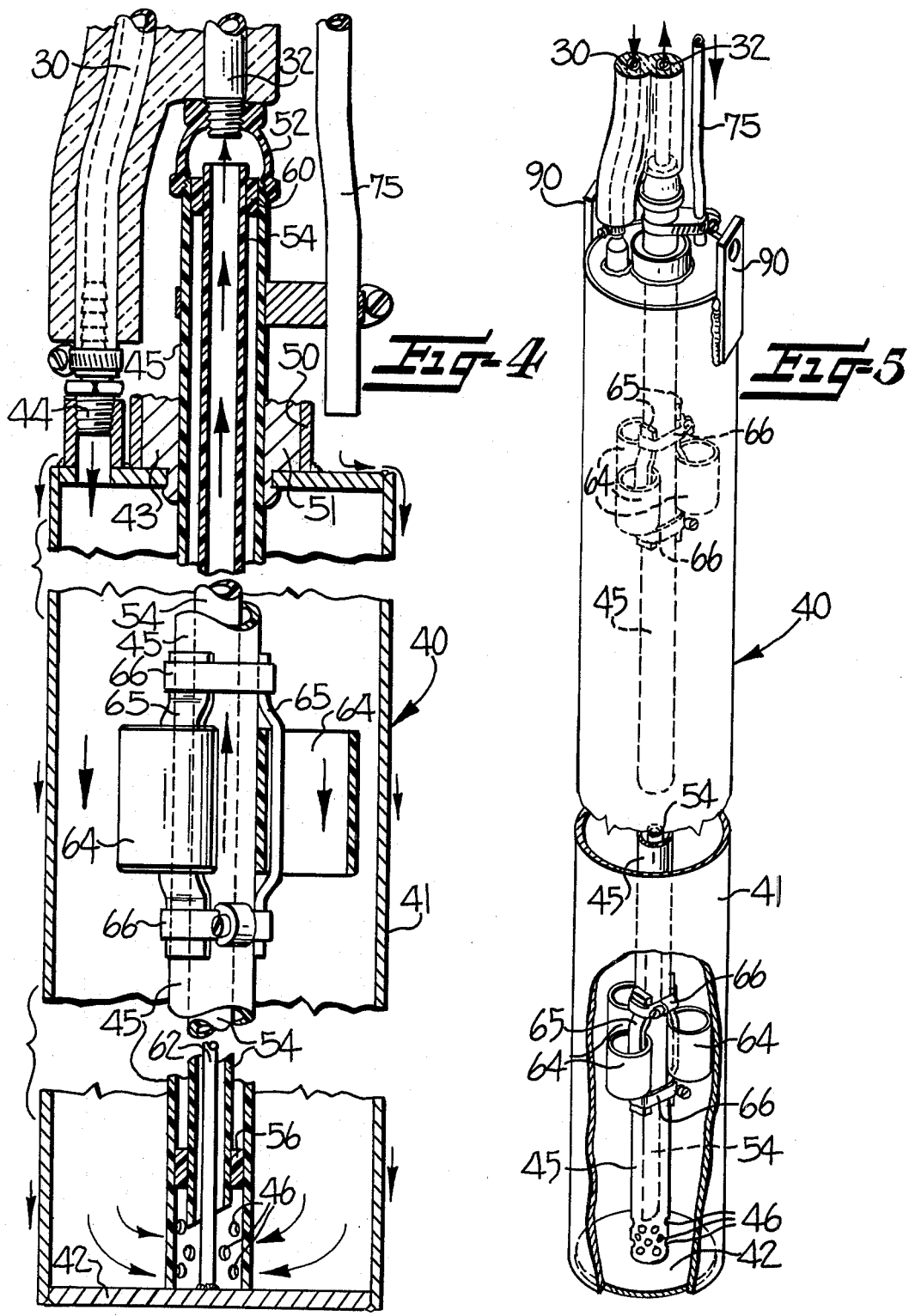

GEOTHERMAL HEATING AND COOLING SYSTEM

FIELD OF THE INVENTION

This invention relates to a heating and/or cooling system by selective transfer of heat between the medium to be heated or cooled and the subterranean water of the earth and more particularly to such a system which will provide conditioned air for enclosed spaces, such as residences, offices, manufacturing facilities and the like.

BACKGROUND OF THE INVENTION

Conventional systems for selectively heating or cooling a particular medium, such as air, require energy from limited sources and which consequently is increasingly more expensive. Much attention has been given, particularly in recent times, to sources of energy which exist as natural phenomena. Such energy includes solar energy, geothermal energy, tidal energy and wind-generated energy. While all of these energy sources have advantages and disadvantages, the geothermal energy appears to be most reliable, readily available and most easily tapped.

It is common knowledge that the center of the earth is extremely hot and that a skin of very dense rock separates the hot interior from the surface of the earth. Although this rock in the earth's skin is resistant to passage of heat, nevertheless a small amount of heat per unit area is transmitted from the hot interior of the earth to the surface of the earth. The amount of heat transmitted from the center of the earth to the surface is found to be $$\text{Heat (calories)} = \frac{1.2 \text{ per square cm. per second}}{1,000,000}$$

or 15.9 BTUs per square foot per hour.

The heat so transmitted through the earth's skin is absorbed by subterranean water which flows through a system of veins. These veins practically blanket the surface of the earth adjacent to the rock skin and vary in depth from the surface of the earth from approximately 100 feet to several hundred feet. In the Piedmont section of North Carolina and South Carolina, the depth is usually from 100 to 200 feet and the temperature of the water is substantially constant at approximately 60 degrees F. This temperature of the subterranean water is maintained by loss of heat by conduction to the surface of the earth. The earth, stone, etc. between the subterranean water and the surface of the earth are fairly good conductors of heat because of the presence of moisture in the soil. Therefore, the input of heat from the center of the earth is balanced by the loss of heat, over a considerable time, from the subterranean water through the surface of the earth.

Many proposals have been made to utilize this heat as a source of geothermal energy with varying degrees of success. Where, through faults in the rock layer separating the very hot core from the earth's surface, heat sources of very high temperatures are near the earth's surface, considerable success has been experienced in utilizing such heat in electric power generation and for other uses. However, where no such faults exist, considerably less success has been obtained—although many different approaches have been suggested.

Among these prior suggestions have been systems which employ coils, tanks or other liquid containers buried in the earth at depths ranging from open containers extending downwardly from the surface to a depth of several feet to coils or closed tanks buried several feet beneath the surface of the earth. These systems have suffered from many deficiencies and have not been effective in tapping this virtually inexhaustible heat source. For example, these systems rely exclusively on the earth immediately surrounding the liquid containers and the heat that can migrate thereinto. This earth or surrounding soil has a decided tendency to become dry as heat is transferred between the soil and container and when dry becomes a thermal insulator around the container. Additionally, such coils, tanks, containers and the like are usually constructed of plastic or other materials which are not efficient thermal conductors and have other inefficiencies inherent or incorporated therein.

Another prior proposal has suggested the use of subterranean water from relatively deep wells as the source of geothermal heat transfer. The main problems with this approach are the disposal of the well water after the heat transfer has occurred, and the energy required to transfer water from the well to the heat pump.

SUMMARY OF THE INVENTION

With the foregoing in mind, it is an object of the present invention to provide a geothermal system for conditioning air which includes an improved heat sink in the form of an elongate liquid container buried in the earth in a generally vertical orientation and providing a large amount of surface contact with the earth to provide a liquid dwell time sufficient for transfer of the requisite amount of heat between the liquid and the earth and subterranean water system. The liquid container is buried in the earth at a sufficient depth to provide a good heat transfer relationship with the subterranean water system and this heat transfer is enhanced by providing means for periodically dispensing a liquid onto the soil surrounding the liquid container to maintain the surrounding soil in a moist state.

In accordance with the present invention, the liquid container includes a liquid inlet communicating with the interior of the uppermost portion of the container and an outlet conduit extending generally longitudinally within the container and communicating with the interior of the container and adjacent the bottom thereof. The outlet conduit is thermally insulated from the liquid in the container substantially throughout its length so that the heat transfer obtained when the liquid passes downwardly in the liquid container is maintained in the liquid as it is withdrawn upwardly through the center of the container. The liquid container is generally cylindrical and preferably has a length of at least about 40 times its diameter to provide a BTU per hour capacity rating of at least 20,000. It is desirable at times to use an extended liquid container of about 80 times its diameter to provide a BTU per hour rating of at least 40,000.

The liquid container heat sink provides a maximum temperature gradient as permitted by the capacity of the heat pump for maximizing the heat transfer rate between the liquid within the liquid container and the subterranean water and it has been determined that a temperature gradient of approximately 20 degrees F. between the temperature of the liquid being withdrawn from the liquid container and the temperature of the subterranean water is preferred with most commercially available heat pumps. The liquid container preferably provides a liquid dwell time sufficient for at least a 10 degree F. change in the temperature of the liquid as it is circulated through the heat sink.

BRIEF DESCRIPTION OF THE DRAWINGS

Other objects and advantages will appear as the description proceeds when taken in connection with the accompanying drawings, in which FIG. 1 is a somewhat schematic view of the present geothermal system and illustrating a heat sink connected to a conventional type of heat pump;

FIG. 2 is a horizontal sectional view illustrating the manner in which the supply and return lines to the liquid containers are insulated;

FIG. 3 is a vertical sectional view taken substantially along the line 3—3 in FIG. 1 and illustrating the manner in which the supply and return lines are insulated in a ditch or trench extending from the heat pump to the heat sink;

FIG. 4 is an enlarged vertical sectional view, with medial portions broken away, to illustrate the construction and arrangement of the elongate liquid container;

FIG. 5 is an elevational view of the elongate liquid container, with a central portion broken away; and FIG. 6 is a vertical sectional view illustrating the manner in which a pair of the elongate liquid containers are interconnected, end to end.

DESCRIPTION OF THE ILLUSTRATED EMBODIMENT

The present geothermal heating and cooling system includes a conventional type of liquid-to-air heat pump, indicated by the dotted-line rectangle 10, and including an air circulation system, indicated by the dotted-line duct 11 and including a fan 12 for circulating air through the heat pump 10 in heat exchange relationship with a refrigerant therein. The fan 12 directs the air into the enclosed space to be heated and cooled, such as the interior of a residence, office, manufacturing facility and the like. The heat pump 10 includes the usual compressor 14, provided with a reversing valve 15 for selectively directing the refrigerant through lines 20 of a closed circuit which interconnects a conditioner 22, a heat exchanger 23, and expansion valves 24.

The heat pump 10 is illustrated in FIG. 1 with the reversing valve 15 in position for heating the air passing through the duct 11. The vaporized refrigerant fluid is compressed by the compressor 14 so that the temperature is raised by compression and delivered to the heat exchanger 22, now operating as a condenser, positioned in the duct 11. The fan 12 moves the air to be heated over the fins of the heat exchanger 22 so that the flowing air is heated by the latent heat given up by the compressed refrigerant vapor which becomes liquified as it cools in passing through the heat exchanger 22. The liquified refrigerant then flows through the expansion valve 24 and into the heat exchange coils of heat exchanger 23, now operating as an evaporator. The drop in pressure of the liquified refrigerant passing through the expansion valve 24 and the absorption of heat in the evaporator 23 causes the liquified refrigerant to evaporate, thereby increasing the temperature of the refrigerant as it passes through the heat exchanger 23. After leaving the heat exchanger 23, the vaporized refrigerant is returned to the input side of the compressor 14 for continuing the air heating cycle. The latent heat of evaporation absorbed by the expanded refrigerant flowing through the heat exchanger 23 is provided by the improved heat sink, in accordance with the present invention, in a manner to be presently described.

When the heat pump 10 of FIG. 1 is used for cooling the air passing through the duct 11, the selector valve 15 is turned 90 degrees from the position shown to reverse the direction of flow of the refrigerant through the connecting lines 20. In this position, the compressor 14 delivers the compressed vaporized refrigerant fluid, the temperature of which is raised by compression, to the coils of the heat exchanger 23, now operating as a condenser, so that the compressed heated refrigerant vapor gives up heat and is reduced in temperature and liquified. The liquified and cooled refrigerant then passes through the expansion valve 24 so that the refrigerant is evaporated as it passes through the heat exchanger 22, now operating as an evaporator. The evaporated refrigerant absorbs heat from the air moved over the heat exchanger 22 by the fan 12. The vaporized refrigerant fluid then moves back to the input side of the compressor 14 to thereby complete a full cooling cycle and is back at approximately its original low temperature and pressure as it enters the input side of the compressor 14 for continuing the air cooling heat exchange cycle. The parts of the heat pump 10 heretofore described are conventional and although a particular type of heat pump has been described, it is to be understood that the improved heat sink of the present invention can be used in association with any type of liquid-to-air heat pump.

A closed circuit liquid circulating system is provided for circulating a liquid (in heat exchange relationship with the refrigerant) through the heat pump 10 and a heat sink in heat exchange relationship with the subterranean water system of the earth. The liquid circulating system includes a supply line 30 with a circulating pump 31 disposed therein and a return line 32 with a circulating pump 33 therein. One end of the supply line 30 is connected to one side of the heat exchanger 23 of the heat pump 10 and one end of the return line 32 is connected to the other side of the heat exchanger 23. The other ends of the supply line 30 and the return line 32 are connected to a heat sink, broadly indicated at 40 in FIG. 1. A liquid supply container 34 is connected to the supply line 30 to maintain the closed circuit liquid circulating system filled with liquid and under a small head pressure.

The heat sink 40 (FIG. 4) includes an elongate liquid container 41 having high thermal conductivity and of a shape to provide a large amount of surface contact with the earth and of a length relative to cross-sectional area to provide a liquid dwell time sufficient for transfer of the requisite amount of heat between the liquid and the earth and subterranean water system as it passes through the container 41. The container 41 preferably has a length which is at least forty times its diameter and a BTU per hour capacity of at least 20,000. In one installation, the container 41 is in the form of a cylindrical metal tube which is six inches in diameter and 20 feet in length and with the lower end being closed by a metal cap 42. The upper end of the container 41 is provided with a closure cap 43 and a liquid inlet conduit 44 communicating with the interior of the top portion of the container 41 and being connected to the liquid supply line 30.

An outlet conduit extends generally longitudinally within the center of the container 41 and communicates with the interior and adjacent the bottom of the container 41 and is thermally insulated from the liquid in the container substantially throughout its length. The outlet conduit includes a centrally disposed 1¼ inch plastic pipe insulator tube 45 having its lower end supported on the lower cap 42 and including a series of liquid passageways or openings 46 therein. The upper end portion of the insulator tube 45 extends through the upper cap 43 and a collar 50 which is filled with a suitable sealing material 51. The upper end portion of the insulator tube 45 is connected to a nipple 52 which is in turn connected to the liquid return line 32.

The outlet conduit of the liquid container 41 also includes a ¾ inch plastic pipe 54 which serves as a return for the liquid and is centered, in spaced relationship from, the insulator pipe or tube 45. The lower end of the return pipe 54 is spaced above the lower cap 42 and is cut at an angle, as illustrated in FIG. 4, and a liquid seal 56 surrounds the pipe 54 to provide a seal between the outer periphery thereof and the inner periphery of the pipe 45 so that the liquid is directed upwardly through the center of the return pipe 54, as indicated by the arrows in FIG. 4. The upper end portion of the return pipe 54 is provided with a seal 60 so that the return pipe 54 is thermally insulated and spaced from the inner periphery of the tube 45 throughout the length thereof.

A stabilizer rod 62 is fixed at its lower end to the center of the lower cap 42 and extends upwardly into the return pipe 54. Suitable centering and stabilizing devices are spaced along the insulator pipe 45 and each of these centering and stabilizing devices includes three two inch lengths of 1½ inch plastic pipe 64. Strap members 65 extend through the pipe lengths 64 and are connected at opposite ends to the pipe 45 by strap clamps 66 to maintain the centering and stabilizing devices in position on the insulation pipe 45.

The heat sink 40 is positioned in the earth in a generally vertical orientation and at a sufficient depth to provide a good heat transfer relationship with the subterranean water system of the earth. Generally, the median portion of the liquid container 41 will be buried in a drilled well hole to a depth of approximately 100 to 200 feet so that the lower end portion thereof is either in direct contact with or fairly closely adjacent to the subterranean water system of the earth. A single liquid container 41 may be used as single unit heat sink or two liquid containers 41 may be connected in end-to-end relationship, as illustrated in FIG. 6.

When two liquid containers 41 are interconnected in end-to-end relationship, as illustrated in FIG. 6, the upper end of the lower container 41 is threaded to receive a coupling collar 70 and the lower end of the upper container 41 is threaded into the collar 70. The upper end of the lower insulator pipe 45 is connected to the lower end of the upper insulator pipe 45 by a collar 71, and the upper end of the lower return tube 54 is connected to the lower end of the upper return tube 54 by a collar 72.

In order to increase the thermal conductivity between the outer surface of the container 41 and the surrounding earth and adjacent subterranean water system, means is provided for periodically dispensing a liquid into the soil surrounding the container 41 so that the soil is maintained in a moist state. As illustrated in FIGS. 1, 4 and 5, the liquid is dispensed onto the upper end of the container 41 and through the lower end of a water supply pipe 75 which is suitably secured adjacent its lower end to the insulator pipe 45. The other end of the water supply line 75 (FIG. 1) is suitably connected to a suitable water source 76. The water source 76 may be provided with a valve for adjusting the flow of the water to the upper end of the container 41 and is preferably a solenoid operated valve electrically connected to the heat pump 10 so that liquid is dispensed each time that the heat pump is operated to maintain the soil surrounding the container 41 in a sufficiently moist condition.

As illustrated in FIG. 3, the liquid supply line 30 and the liquid return line 32 are buried in a suitable ditch 80 extending from the heat sink 40 to the heat pump 10. The supply line 30 and return line 32 are insulated by "snap-on" type insulation material 82, 83 and are sandwiched between upper and lower blocks of styrofoam insulation 84, 85 which are then covered with dirt 86. The vertical portions of the supply line 30 and the return line 32 (FIG. 2) are also covered by "snap-on" type insulation 82, 83. To aid in installation and removal of the heat sink 40, hoisting strap members 90 are fixed to the upper end of the liquid container 41, as illustrated in (FIG. 5).

During both the heating and cooling cycle of the heat pump 10, the liquid in the heat sink 40 is circulated through the closed system by the pumps 31 and 33 so that the liquid enters the upper end of the container 41 and passes downwardly throughout the length thereof and in contact with the outer metal surface so that the temperature of the liquid is either increased or decreased as it moves from the upper end of the container 41 to the lower end thereof, depending upon the temperature of the liquid being introduced through the inlet conduit 44, relative to the temperature of the surrounding soil and subterranean water, and is withdrawn from the lower end of container 41 and passed through heat pump 10. The normal temperature of the surrounding soil and subterranean water is approximately 60 degrees F. during all seasons of the year and will either absorb heat from the liquid in the container 41 or supply heat to the liquid in the container 41, depending upon the temperature of the liquid entering the container 41.

The heat sink 40 is very efficient for the heat transfer because the earth surrounding the heat sink 40 is maintained in a moist condition and the heat sink 40 is either in direct contact or very good heat transfer relationship with the subterranean water system of the earth so that a large mass of the earth and the subterranean water system provides for the large-scale transfer of heat without substantial change of temperature of the surrounding soil. As the liquid, after passing in heat transfer relationship with the container 41, is withdrawn from the container adjacent the lower portion thereof and passes upwardly through the pipe 54, it is insulated from the liquid passing downwardly in the container and substantially throughout its length so that the temperature of the liquid being removed from the container 41 is not changed.

It has been found that the present geothermal heating and cooling system operates most efficiently when the differential between the temperature of the soil surrounding the heat sink 40 (normally 60 degrees F.) and the temperature of the liquid being withdrawn from the container 41 and circulated through the heat pump 10 is as large as is permitted by the capacity of the heat pump 10. With a particular commercially available heat pump, it has been determined that a 20 degree F. differential is possible and provides excellent results. With such a temperature gradient of 20 degrees F., it has been found that a 10 degree variation in temperature of the liquid is obtained in the heat pump 10.

In one test installation utilizing a container 41 which was six (6) inches in diameter and approximately twenty (20) feet in length, the container was installed in an eight (8) inch diameter hole one hundred eight (108) feet deep and the hole was filled with sand and gravel. The heat sink was not in direct contact with the subterranean water. Tests were conducted on Mar. 2, 1980 at approximately 9:45 a.m. at which time the outside temperature was 16 degrees F. (preceded by an outside temperature of below 20 degrees F. for more than 12 hours) and the temperature of the enclosed space being heated (approximately 800 square feet) was maintained at a constant 70 degrees F. The weather was snow with considerable wind with a chill factor near or below zero (0) degrees F.

The temperature of liquid being withdrawn from container 41 and supplied to heat pump 10 was 40.5 degrees F. and the temperature of liquid leaving the heat pump 10 and entering the container 41 was 30.5 degrees F. for a temperature difference across the heat pump of 10 degrees F. The temperature gradient of the heat sink and subterranean water was 19.5 degrees F. The quantity of liquid being circulated through the heat pump 10 was 5 gallons per minute or slightly more. Under these conditions, 25,035 BTU's per hour in geothermal energy were extracted by the heat sink from the earth and supplied to heat the enclosed space.

It has accordingly been determined that a single section heat sink according to this invention will have a BTU per hour rating of from 20,000 to 30,000 and a double section heat sink according to this invention will have a BTU per hour rating of from 40,000 to 60,000. While the actual BTU's per hour provided by the system of this invention will vary from installation to installation depending upon many factors including, for example, the heat transfer relationship with the subterranean water, the temperature gradient permitted by the particular heat pump, and soil conditions, the heat sink of this invention provides an inexpensive and very efficient geothermal energy source.

By maintaining the soil surrounding the heat sink 40 in a moist condition and by positioning the heat sink 40 at sufficient depth in the earth that a good heat transfer relationship is maintained between the surrounding earth and the subterranean water system of the earth, a very large reservoir for absorbing or liberating heat is provided so that a higher operating efficiency is obtained by the geothermal heating and cooling system of the present invention. The thermal insulation of the liquid in the heat sink 40 from the liquid being withdrawn ensures that the heat transfer relationship between the incoming liquid and the adjacent soil is not changed during the removal of the liquid from the heat sink 40.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. In a geothermal system for conditioning air in an enclosed space by selective transfer of heat between such air and the subterranean water system of the earth including a heat pump of the liquid-to-air type, an air circulation system for circulating air through said heat pump in heat exchange relationship with a refrigerant therein and for directing such air into the enclosed space, and a liquid circulating system for circulating a liquid through said heat pump in heat exchange relationship with said refrigerant, and a heat sink in heat exchange relationship with the subterranean water system of the earth and connected to said liquid circulating system, the improvement therein wherein said heat sink comprises (a) an elongate, generally cylindrical liquid container of a material having high thermal conductivity, said container having a length of at least about forty times its diameter to provide a large amount of surface contact with the earth for the volume of liquid contained therein, said container being buried in the earth in a generally vertical orientation and at a depth providing a good heat transfer relationship with the subterranean water system of the earth, said container having an inlet conduit communicating with the interior of the container at the top thereof and an outlet conduit extending generally longitudinally of and within said container and communicating with the interior of said container adjacent the bottom thereof so that liquid enters at the top of said container, travels downwardly therein in heat transfer relationship with the thermally conductive material of the container and is withdrawn from the bottom portion of the container, means surrounding and thermally insulating said outlet conduit substantially throughout its length from the liquid in said container, and means for maintaining said outlet conduit substantially centered within said container and for stabilizing said outlet conduit therein, said centering and stabilizing means including a plurality of positioning devices spaced along said outlet conduit, said positioning devices extending between the interior of said container and said outlet conduit and permitting the liquid to travel downwardly around said outlet conduit, (b) said liquid circulating system providing a temperature gradient of approximately 20 degrees F. between the liquid being withdrawn from said container and the subterranean water for maximizing the heat transfer rate between said heat sink and the subterranean water and also providing a predetermined liquid dwell time sufficient for at least about a 10 degree F. change in temperature of the liquid within said heat sink and a BTU per hour capacity rating of at least 20,000.

2. A system according to claim 1 wherein said outlet conduit includes a centrally disposed nonmetallic insulator tube having a lower end supported in the lower end of said liquid container and extending upwardly throughout the length of said liquid container, a nonmetallic liquid return pipe extending through and in spaced relationship from said insulator tube, and liquid seal means providing a liquid seal between said insulator tube and said return pipe at the adjacent lower ends thereof.

3. A system according to claim 1 wherein said centering and stabilizing means includes a stabilizer rod carried by and extending upwardly from the lower end of said container and having its upper portion disposed in said return pipe.

4. A system according to claim 3 wherein said positioning devices each comprises a plurality of lengths of nonmetallic pipe spaced around said insulator tube, and means for attaching said nonmetallic lengths of pipe to said insulator tube.

5. A system according to claim 1 wherein said container comprises a metallic tube closed at its opposite ends and having a diameter of approximately six (6) inches and a length of approximately twenty (20) feet.

6. A system according to claim 1 wherein said container comprises a metallic tube closed at its opposite ends and having a diameter of approximately six (6) inches and a length of approximately forty (40) feet.

7. A heat sink for selective transfer of heat to or from the earth and the subterranean water system thereof to provide an inexpensive and highly efficient source of geothermal energy, said heat sink comprising (a) a relatively long and slim tubular container closed at its opposite ends and of a material having high thermal conductivity and providing a large amount of heat transfer surface area, said container being adapted to be filled with a liquid heat transfer medium and being adapted to be buried in the earth in a generally vertical orientation and at a depth providing a good heat transfer relationship with the subterranean water system of the earth, said container having a length of at least about forty times its diameter to provide a liquid dwell time sufficient for transfer of at least about 20,000 BTU's per hour of heat between the liquid in said heat sink and the earth, (b) inlet conduit means communicatively connected to said container at one end thereof adapted to be the upper end when said heat sink is in use for supplying liquid to said container, (c) outlet conduit means connected to said container at said one end thereof and penetrating thereinto and extending longitudinally and internally thereof to a position adjacent the other end of said container for withdrawing liquid from said container adjacent the bottom end thereof and directing such liquid to a heat transfer exchange exteriorly of said heat sink, said outlet conduit means including a centrally disposed nonmetallic insulator tube having a lower end supported in said other end of said container and extending upwardly throughout the length of said container, a nonmetallic liquid return pipe extending through and in spaced relationship from said insulator tube, and liquid seal means providing a liquid seal between said insulator tube and said return pipe at the adjacent lower ends thereof, and (d) centering and stabilizing means operably associated with said outlet conduit means within said container for maintaining said outlet conduit means substantially centered within said container and for stabilizing the same in that position 8. A heat sink according to claim 7 wherein said container is generally cylindrical, is metallic, and has a diameter of approximately six (6) inches and a length of approximately twenty (20) feet.

9. A heat sink according to claim 7 wherein said container is generally cylindrical, is metallic, and has a diameter of approximately six (6) inches and a length of approximately forty (40) feet.

10. A heat sink according to claim 7 wherein said container comprises a pair of metallic tubes, each of said metallic tubes having a diameter of approximately six (6) inches and a length of approximately twenty (20) feet, and including means coupling said pair of metallic tubes together in end-to-end relationship.

11. A heat sink according to claim 7 including means for periodically dispensing a liquid onto the upper end of said container for maintaining the earth surrounding said container in a moist state to increase the thermal conductivity between said container and the surrounding earth and subterranean water system.

* * * * *